US010296201B2

(12) United States Patent
Wang et al.

(10) Patent No.: US 10,296,201 B2
(45) Date of Patent: May 21, 2019

(54) METHOD AND APPARATUS FOR TEXT SELECTION

(71) Applicant: Beijing Xiaomi Mobile Software Co., Ltd., Beijing (CN)

(72) Inventors: Xi Wang, Beijing (CN); Shengqiang Xu, Beijing (CN); Ran Xie, Beijing (CN); Haiyang Yi, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 104 days.

(21) Appl. No.: 15/625,158

(22) Filed: Jun. 16, 2017

(65) Prior Publication Data

US 2017/0371513 A1    Dec. 28, 2017

(30) Foreign Application Priority Data

Jun. 23, 2016  (CN) .......................... 2016 1 0466423

(51) Int. Cl.
*G06F 3/0486*     (2013.01)
*G06F 17/24*      (2006.01)
(Continued)

(52) U.S. Cl.
CPC ........ *G06F 3/0486* (2013.01); *G06F 3/04812* (2013.01); *G06F 3/04842* (2013.01);
(Continued)

(58) Field of Classification Search
CPC ........................ G06F 3/04812; G06F 3/0486
(Continued)

(56) References Cited

U.S. PATENT DOCUMENTS 8,732,593 B2 *  5/2014  Van Wie ............. H04L 12/1822
                                                   707/724
8,830,270 B2 *  9/2014  Zaman ................ G06F 3/04883
                                                   345/649
(Continued)

FOREIGN PATENT DOCUMENTS

CN    101526881 A    9/2009
CN    102937864 A    2/2013
(Continued)

OTHER PUBLICATIONS

International Search Report issued by the State Intellectual Property Office of the People's Republic of China (SIPO) on Apr. 12, 2017, in counterpart International Application No. PCT/CN2016/106379.
(Continued)

*Primary Examiner* — William D Titcomb
(74) *Attorney, Agent, or Firm* — Finnegan, Henderson, Farabow, Garrett & Dunner LLP

(57) ABSTRACT

A method for text selection includes: determining, in text for selection, a first display position of a start selection point and a first display position of an end selection point, wherein text between the start selection point and the end selection point is target text including at least one character; partitioning the text for selection into a plurality of text blocks based on semantic meaning; receiving a dragging operation corresponding to the start selection point or the end selection point; and changing, according to the dragging operation, the first display position of the start selection point or the first display position of the end selection point to a corresponding second display position in unit of a text block.

13 Claims, 13 Drawing Sheets

(51) Int. Cl.
　　　*G06F 17/27*　　　(2006.01)
　　　*G06F 3/0488*　　(2013.01)
　　　*G06F 3/0481*　　(2013.01)
　　　*G06F 3/0484*　　(2013.01)
(52) U.S. Cl.
　　　CPC .......... *G06F 3/04883* (2013.01); *G06F 17/24* (2013.01); *G06F 17/277* (2013.01)
(58) Field of Classification Search
　　　USPC ........................................................ 715/769
　　　See application file for complete search history.

(56) References Cited

U.S. PATENT DOCUMENTS

| | | | | |
|---|---|---|---|---|
| 9,535,906 | B2* | 1/2017 | Lee | G06F 1/1626 |
| 2006/0053382 | A1* | 3/2006 | Gardner | G06F 3/0482 |
| | | | | 715/764 |
| 2009/0228792 | A1 | 9/2009 | Van Os et al. | |
| 2009/0228842 | A1 | 9/2009 | Westerman et al. | |
| 2012/0023399 | A1* | 1/2012 | Hoshino | G06F 17/2735 |
| | | | | 715/256 |
| 2012/0079372 | A1 | 3/2012 | Kandekar et al. | |
| 2012/0229493 | A1 | 9/2012 | Kim et al. | |
| 2012/0254318 | A1* | 10/2012 | Poniatowski | H04N 21/4788 |
| | | | | 709/206 |
| 2012/0306772 | A1 | 12/2012 | Tan et al. | |
| 2013/0125008 | A1* | 5/2013 | Irvine | G06F 3/0482 |
| | | | | 715/739 |
| 2014/0280109 | A1* | 9/2014 | Zomet | G06F 17/3097 |
| | | | | 707/728 |
| 2014/0358545 | A1* | 12/2014 | Robichaud | G10L 15/18 |
| | | | | 704/257 |
| 2015/0082246 | A1 | 3/2015 | Tan et al. | |
| 2015/0121179 | A1* | 4/2015 | Saund | G06F 3/0482 |
| | | | | 715/202 |
| 2016/0328147 | A1* | 11/2016 | Zhang | G06F 3/0237 |
| 2017/0052659 | A1* | 2/2017 | Ivanov | G06F 17/30867 |
| 2017/0068445 | A1* | 3/2017 | Lee | G06F 3/04886 |
| 2017/0109335 | A1* | 4/2017 | Lee | G06K 9/00442 |
| 2017/0255686 | A1* | 9/2017 | Ross | G06F 17/30572 |
| 2017/0364495 | A1* | 12/2017 | Srinivasan | G06F 17/2288 |

FOREIGN PATENT DOCUMENTS

| | | |
|---|---|---|
| CN | 103186345 A | 7/2013 |
| CN | 103608760 A | 2/2014 |
| CN | 104375980 A | 2/2015 |
| CN | 106126052 A | 11/2016 |
| JP | 06-12411 A | 1/1994 |
| JP | 09-190436 A | 7/1997 |
| RU | 2013132564 A | 1/2015 |
| WO | WO 2013/16401 A1 | 11/2013 |

OTHER PUBLICATIONS

Office Action issued in Russian Patent Application No. 2017112514/08(021999), dated Apr. 10, 2018.

Extended European Search Report issued in European Patent Application No. 17176659.5, mailed from the European Patent Office, dated Nov. 14, 2017.

* cited by examiner

METHOD AND APPARATUS FOR TEXT SELECTION

CROSS-REFERENCE TO RELATED APPLICATION

This application is based on and claims priority to Chinese Patent Application No. 201610466423.1, filed on Jun. 23, 2016, which is incorporated herein by reference in its entirety.

FIELD

The present disclosure generally relates to the field of text operation, and more particularly, to a method and apparatus for text selection.

BACKGROUND

When a user wants to perform copying, marking, moving or other operations on a text area, the user usually first selects the text area.

For example, on a terminal which may be operated via a touch screen, upon text being in a mode for selection, two selection points may occur before and after the text respectively. The user may select a text area by dragging the two selection points with fingers. Selection of the text area may not be accurate enough, since the operation on the selection points with fingers is typically imprecise.

SUMMARY

According to a first aspect of the disclosure, a method for text selection is provided. The method includes: determining, in text for selection, a first display position of a start selection point and a first display position of an end selection point, wherein text between the start selection point and the end selection point is target text including at least one character; partitioning the text for selection into a plurality of text blocks based on semantic meaning; receiving a dragging operation corresponding to the start selection point or the end selection point; and changing, according to the dragging operation, the first display position of the start selection point or the first display position of the end selection point to a corresponding second display position in unit of a text block.

According to a second aspect of the disclosure, an apparatus for text selection is provided. The apparatus includes: a processor; and a memory for storing instructions executable by the processor. The processor is configured to: determine, in text for selection, a first display position of a start selection point and a first display position of an end selection point, wherein text between the start selection point and the end selection point is target text including at least one character; partition the text for selection into a plurality of text blocks based on semantic meaning; receive a dragging operation corresponding to the start selection point or the end selection point; and change, according to the dragging operation, the first display position of the start selection point or the first display position of the end selection point to a corresponding second display position in unit of a text block.

According to a third aspect of the disclosure, a non-transitory computer-readable storage medium having instructions stored thereon is provided. The instructions, when executed by a processor of a terminal, cause the terminal to perform a method for text selection. The method includes: determining, in text for selection, a first display position of a start selection point and a first display position of an end selection point, wherein text between the start selection point and the end selection point is target text including at least one character; partitioning the text for selection into a plurality of text blocks based on semantic meaning; receiving a dragging operation corresponding to the start selection point or the end selection point; and changing, according to the dragging operation, the first display position of the start selection point or the first display position of the end selection point to a corresponding second display position in unit of a text block.

It is to be understood that both the forgoing general description and the following detailed description are exemplary only, and are not restrictive of the present disclosure.

BRIEF DESCRIPTION OF THE DRAWINGS

The accompanying drawings, which are incorporated in and constitute a part of this specification, illustrate embodiments consistent with the invention and, together with the description, serve to explain the principles of the invention.

DETAILED DESCRIPTION

Reference will now be made in detail to exemplary embodiments, examples of which are illustrated in the accompanying drawings. The following description refers to the accompanying drawings in which same reference numbers in different drawings represent same or similar elements unless otherwise described. The implementations set forth in the following description of exemplary embodiments do not represent all implementations consistent with the disclosure. Instead, they are merely examples of apparatus and methods consistent with aspects related to the disclosure as recited in the appended claims.

The methods for text selection provided in various embodiments of the disclosure may be implemented by a terminal having a display screen. The terminal may be an electronic device, such as, a cellphone, a tablet, an e-book reader, a Moving Picture Experts Group Audio Layer III (MP3) player, a Moving Picture Experts Group Audio Layer IV (MP4) player, a portable computer, or a desktop computer.

Figure 1:
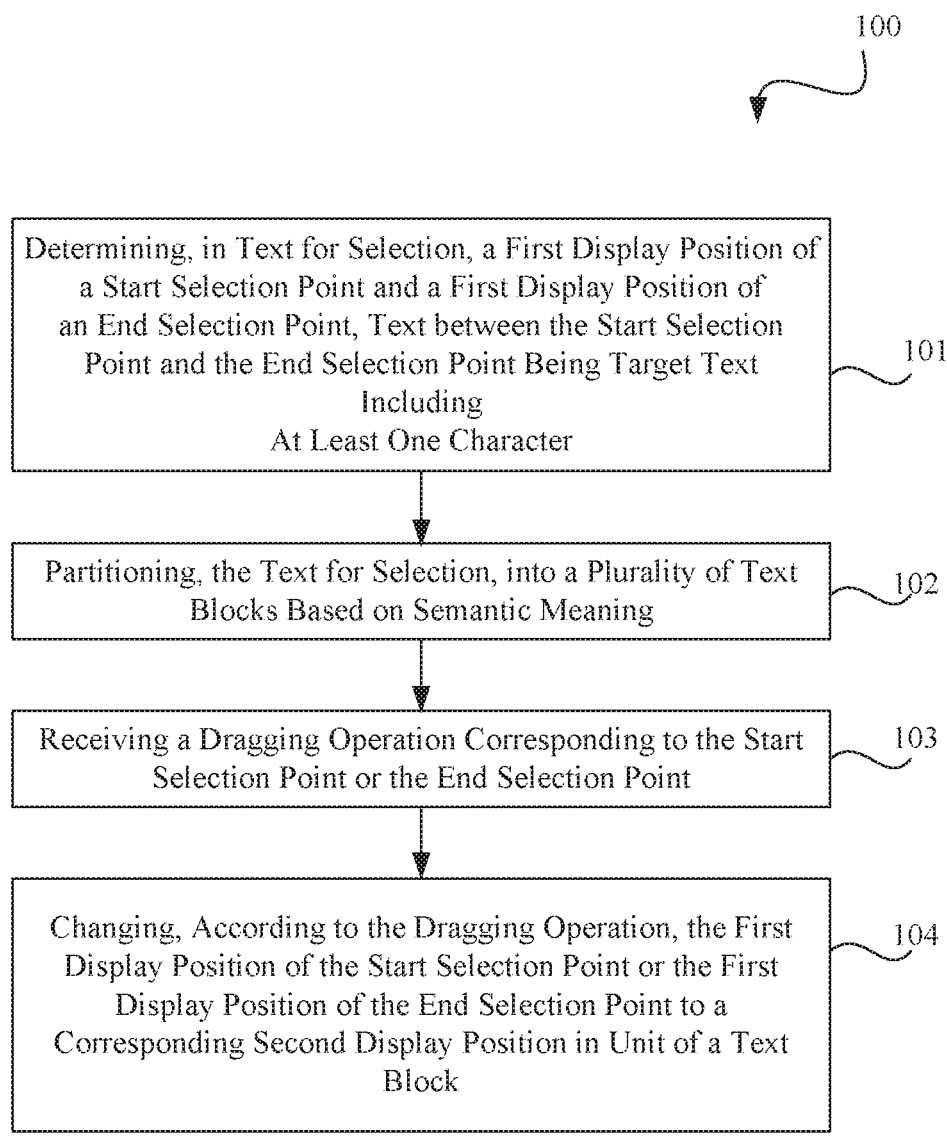
FIG. 1 is a flowchart of a method for text selection according to an exemplary embodiment.

FIG. 1 is a flowchart of a method 100 for text selection according to an exemplary embodiment. The method 100 for text selection may be applied to the terminal, and may include the following steps.

In step 101, a first display position of a start selection point and a first display position of an end selection point are determined in text for selection. Text between the start selection point and the end selection point is target text including at least one character.

In step 102, the text for selection is partitioned into a plurality of text blocks based on semantic meaning.

In step 103, a dragging operation corresponding to the start selection point or the end selection point is received.

In step 104, the first display position of the start selection point or the first display position of the end selection point is changed, according to the dragging operation, to a second display position in unit of a text block.

As noted above, in related prior art, selection for target text based only on an operation of a user may not be accurate enough, since the operation of the user is imprecise. The method 100 for text selection solves such problem by, for example, determining, in text for selection, a first display position of a start selection point and a first display position of an end selection point, partitioning the text for selection into a plurality of text blocks based on semantic meaning; receiving a dragging operation corresponding to the start selection point or the end selection point; and changing, according to the dragging operation, the first display position of the start selection point or the first display position of the end selection point to a second display position in unit of a text block. The method 100 changes selected target text in unit of a text block formed based on semantics such that content of the selected target text conforms better to the semantic meaning and is more accurate.

Figure 2:
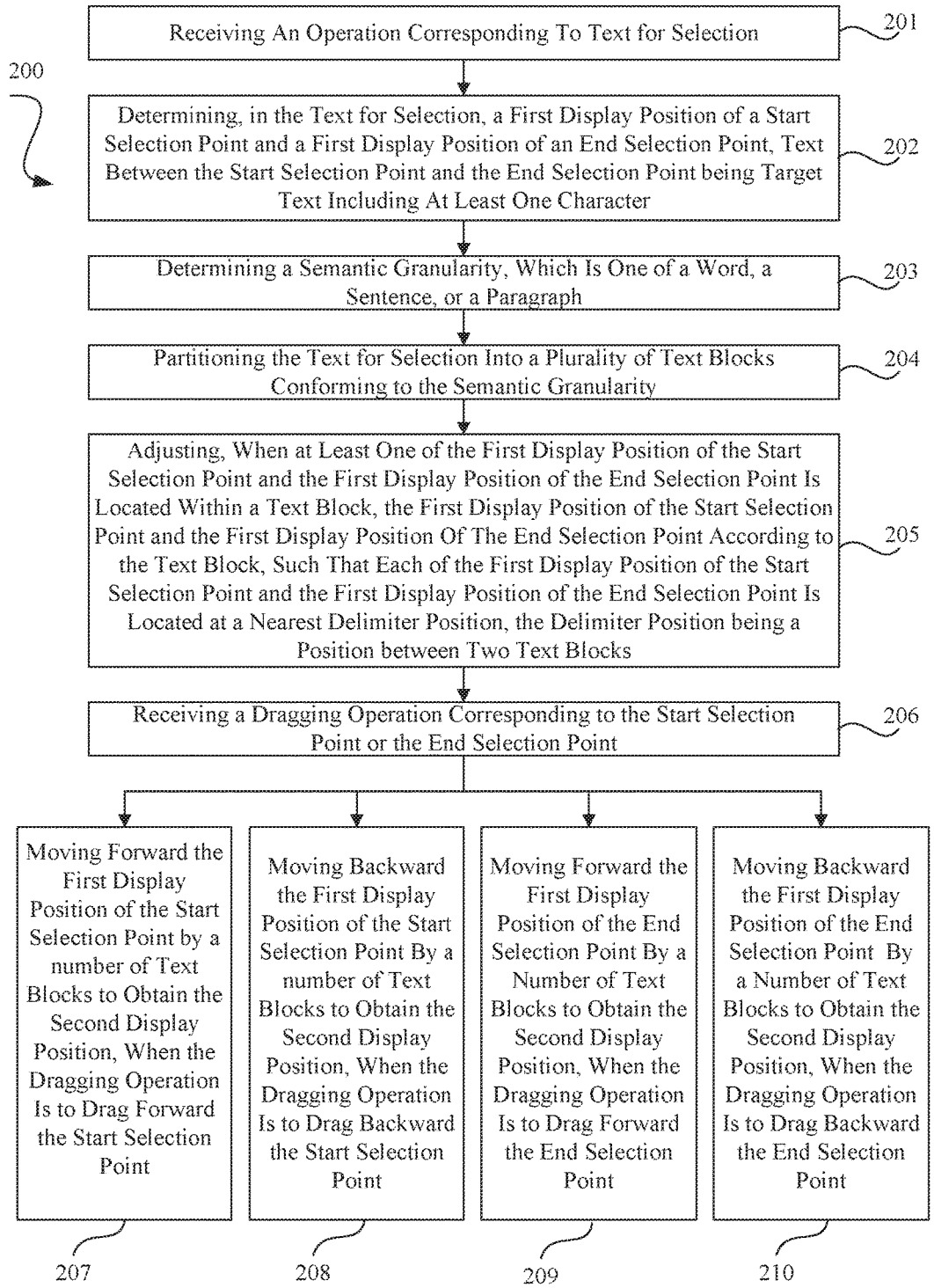
FIG. 2 is a flowchart of a method for text selection according to another exemplary embodiment.

FIG. 2 is a flowchart of a method 200 for text selection according to another exemplary embodiment. The method 200 for text selection may be applied in the terminal and may include the following steps.

In step 201, an operation corresponding to text for selection is received. The operation causes the text for selection to be in a mode for selection.

In some embodiments, the text for selection is any text displayed on a terminal.

In some embodiments, the operation is a click operation. The terminal causes the text for selection into to be in the mode for selection when the terminal detects that an operation duration of the click operation corresponding to the text for selection is greater than a predetermined threshold or the click operation is a double-click operation. The predetermined threshold may be pre-set by a system of the terminal or defined by a user, which is not limited herein.

In step 202, a first display position of a start selection point and a first display position of an end selection point are determined in the text for selection. Text between the start selection point and the end selection point is target text including at least one character.

In some embodiments, the start selection point and the end selection point occur in the text for selection upon the text being into the mode for selection. Text between the start selection point and the end selection point is target text. The first display position of the start selection point and the first display position of the end selection point may be located within a predetermined area of an operation point of the received operation. A style of the start selection point and the end selection point, and the predetermined area are not limited in the present disclosure.

In some embodiments, the first display position of the start selection point is ahead of the first display position of the end selection point. For example, the first display position of the start selection point is horizontally to the left of the first display position of the end selection point. Also for example, the first display position of the start selection point is vertically above the first display position of the end selection point.

In some embodiments, after the text for selection is in the mode for selection, an operation menu for operating the target text will occur upon the text for selection goes into the mode for selection. The operation menu may include an option of setting semantic granularity, and one or more operations on the selected target text. Content and form of the operation menu, and a location where the operation menu occurs, are not limited in the present disclosure.

In some embodiments, at least one of a background color, word color, and text font of the target text is different from that of other text, such that a visual effect of the target text is different from that of other text, which is not limited in the present disclosure.

Figure 3A:
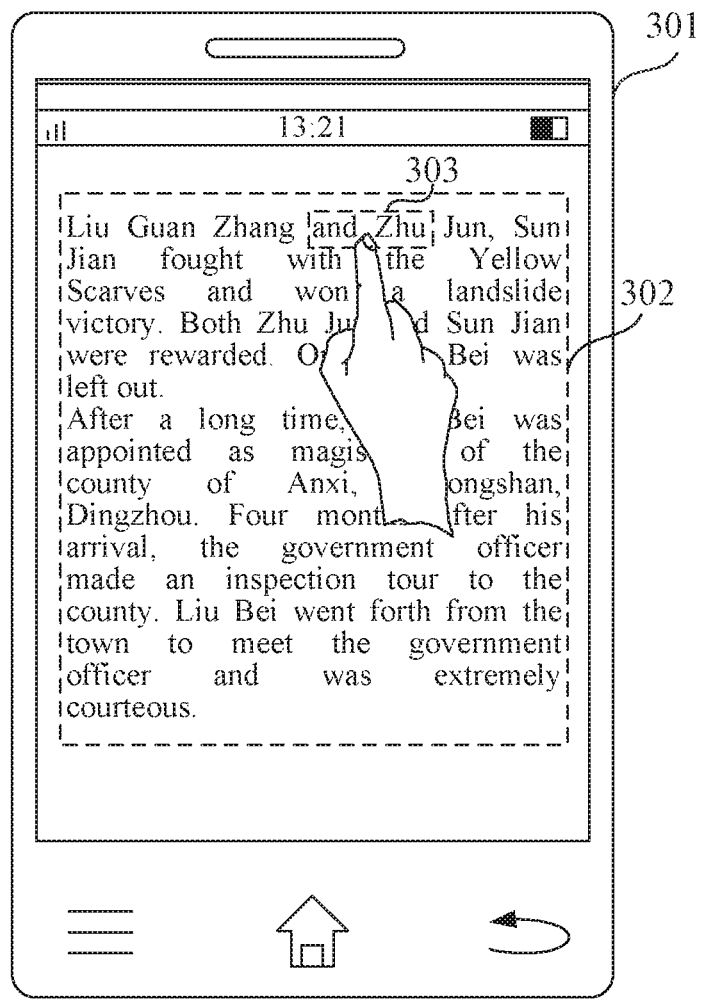
FIG. 3A is a schematic diagram of an interface for text selection according to an exemplary embodiment.

For example, FIG. 3A shows an interface for text selection on a terminal 301 (e.g., a cellphone) operated with a touch screen. As shown in FIG. 3A, text for selection 302 is displayed on the terminal 301. The text for selection 302 may go into a mode for selection, when a user is pressing on an operation point 303 in the text for selection 302 for a certain period.

Figure 3B:
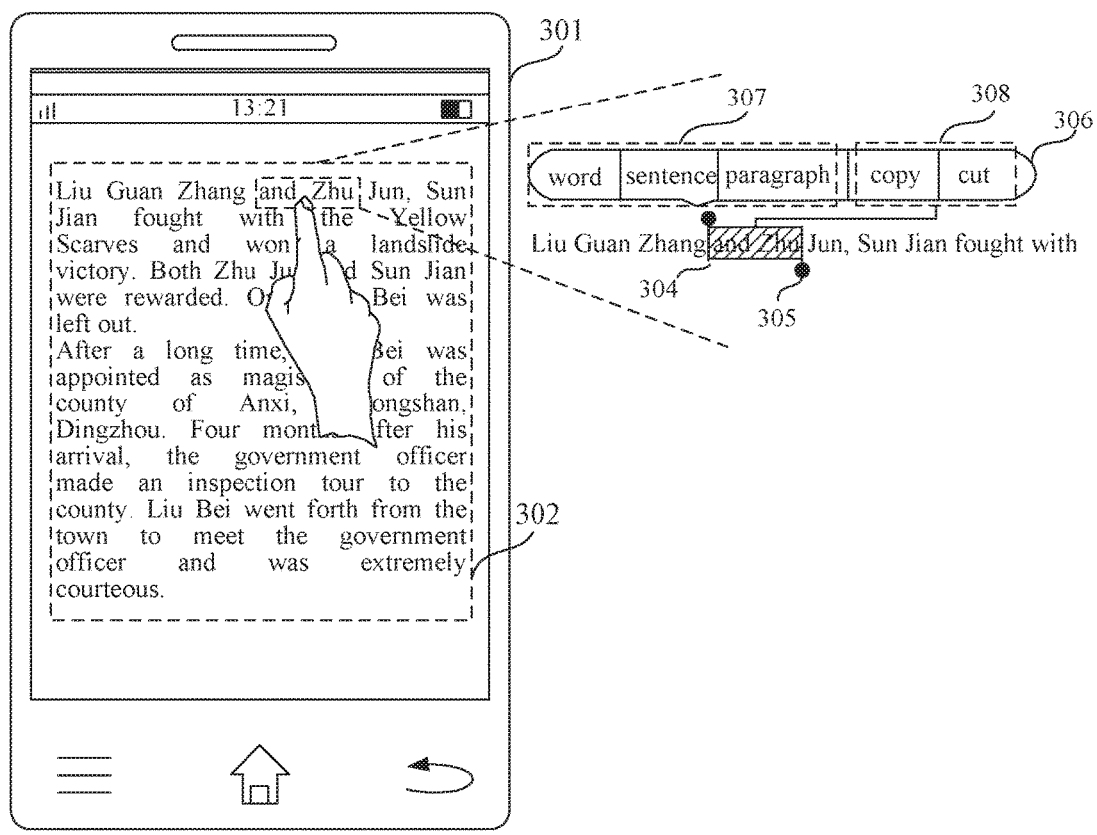
FIG. 3B is a schematic diagram of an interface for text selection according to another exemplary embodiment.

A start selection point 304, an end selection point 305 and an operation menu 306 may occur, when the text for selection 302 goes into the mode for selection, as shown in FIG. 3B. In FIG. 3B, a first display position of the start selection point 304 and a first display position of the end selection point 305 are located in a predetermined area around the operation point 303. Target text is between the tart selection point 304 and the end selection point 305.

The operation menu 306 may include an option 307 for setting semantic granularity, and an option 308 including one or more operations on the target text. For example, the option 307 for setting semantic granularity may include a word, a sentence, or a paragraph, and the one or more operations of the option 308 may include copy and cut.

In step 203, semantic granularity is determined, which is one of a word, a sentence, or a paragraph. A selection of one semantic granularity from the option 307 is received by the terminal to determine the semantic granularity.

In step 204, the text for selection is partitioned based on the semantic meaning into a plurality of text blocks conforming to the determined semantic granularity.

In some embodiments, when the semantic granularity is a word, the terminal may match character strings in the text for selection with word entries in a dictionary stored on the terminal. When a character string in the text for selection is a word entry in the dictionary, the terminal may determine the character string as a text block. When a character in the text for selection cannot form a word entry in the dictionary by concatenating this character with one or more characters before or after this character, the terminal may determine this character as a text block. Namely, the partitioned text blocks may be a word, a character or a punctuation, when the semantic granularity is a word.

In some embodiments, when the semantic granularity is a sentence, the terminal may partition the text for selection into a plurality of text blocks, by detecting punctuations in the text for selection. Each of the text blocks is a sentence including character strings and punctuations after the character strings.

In some embodiments, when the semantic granularity is a paragraph, the terminal may partition the text for selection into a plurality of text blocks, by detecting line feeds s in the text for selection. Each of the text blocks is a paragraph.

Methods for partitioning the text for selection are not limited in the embodiments.

Figure 4A:
FIG. 4A is a schematic diagram of an interface for text selection according to yet another exemplary embodiment.
Figure 4B:
FIG. 4B is a schematic diagram of an interface for text selection according to still yet another exemplary embodiment.
Figure 4C:
FIG. 4C is a schematic diagram of an interface for text selection according to still yet another exemplary embodiment.

For example, for the text for selection shown in FIG. 3A, when the semantic granularity is a word, a partition result of the text for selection 302 is shown in FIG. 4A, in which "/" is used as a delimiter between text blocks; when the semantic granularity is a sentence, a partition result of the text for selection 302 is shown in FIG. 4B, in which "/" is used as a delimiter between text blocks; and when the semantic granularity is a paragraph, a partition result of the text for selection 302 is shown in FIG. 4C, in which "/" is used as a delimiter between text blocks.

In step 205, when at least one of the first display position of the start selection point and the first display position of the end selection point is located within a text block, the first display position of the start selection point and the first display position of the end selection point are adjusted according to the text block, such that each of the first display position of the start selection point and the first display position of the end selection point is located at a nearest delimiter position. The delimiter position is a position between two text blocks.

In some embodiments, when the first display position of the start selection point or the first display position of the end selection point is located within a text block, and is of the same distance from the immediate left delimiter position and from the immediate right delimiter position, the first display position of the start selection point or the first display position of the end selection point is randomly located at either of the immediate left delimiter position or the immediate right delimiter position.

In some embodiments, the first display position of the start selection point and the first display position of the end selection point are adjusted according to the text block, such that the first display position of the start selection point moves forward and is located at a delimiter position between the text block and an immediately previous text block, and the first display position of the end selection point moves backward and is located at a delimiter position between the text block and an immediately next text block. For example, moving forward may be at least one of moving leftward horizontally and moving upward vertically, and moving backward may be at least one of moving rightward horizontally and moving downward vertically.

It is to be noted that step 205 is optional. When the first display position of the start selection point and the first display position of the end selection point are respectively located at delimiter positions between text blocks, it may not be necessary to perform step 205 to adjust the first display position(s).

Figure 5A:
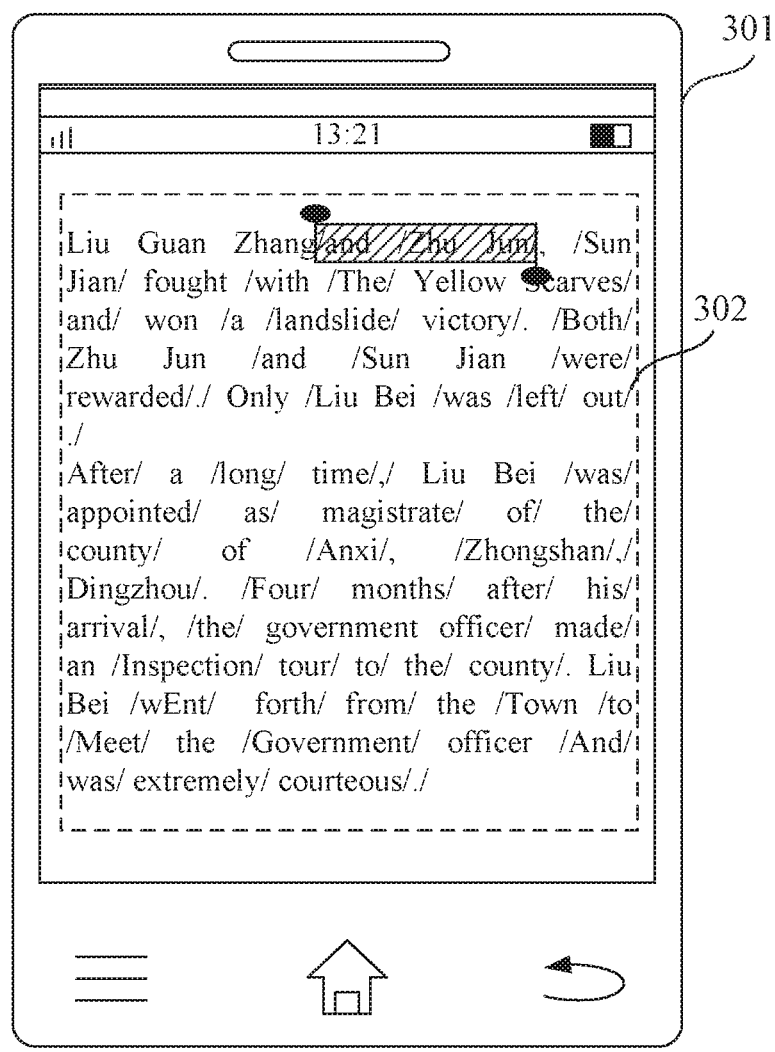
FIG. 5A is a schematic diagram of an interface according to still yet another exemplary embodiment.
Figure 5B:
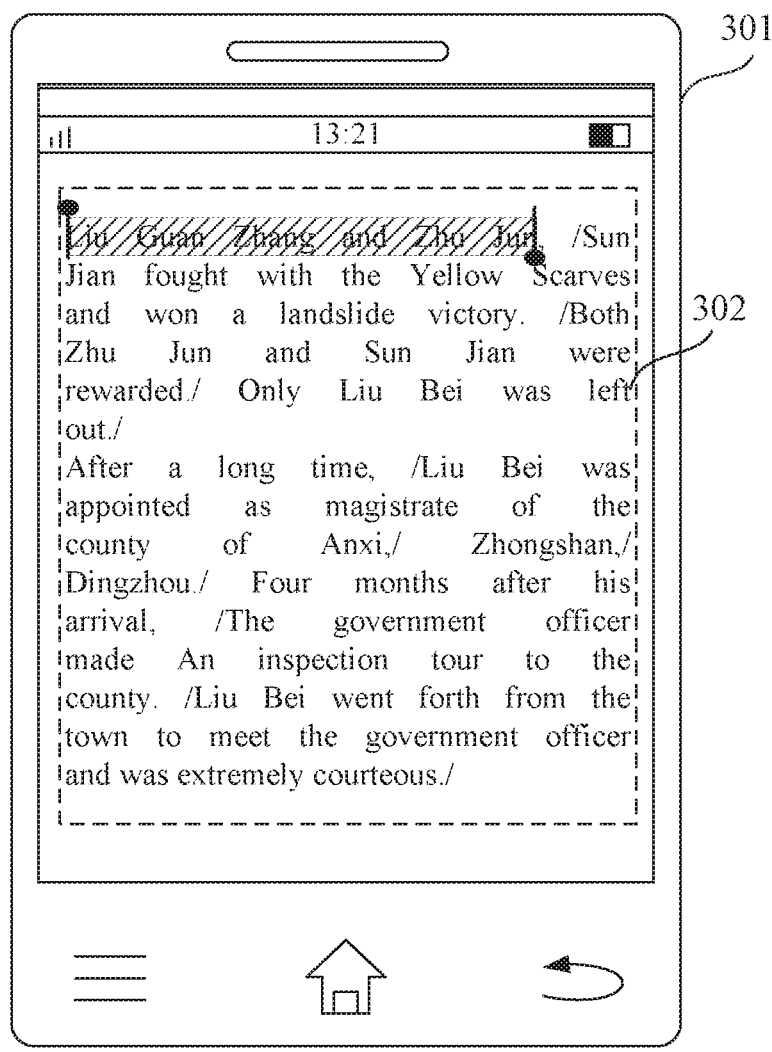
FIG. 5B is a schematic diagram of an interface according to still yet another exemplary embodiment.
Figure 5C:
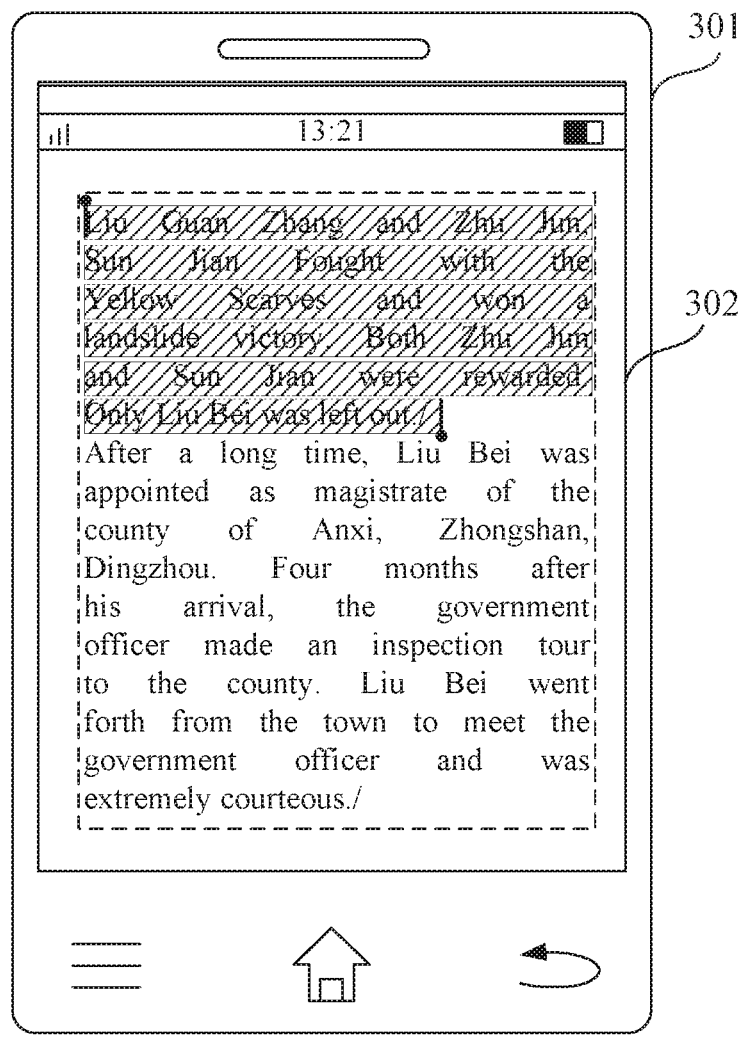
FIG. 5C is a schematic diagram of an interface according to still yet another exemplary embodiment.

For example, when the semantic granularity is a word, and the partition result of the text for selection 302 is shown in FIG. 4A, the start selection point 304 and the end selection point 305 shown in FIG. 3B are adjusted to those shown in FIG. 5A; when the semantic granularity is a sentence, the start selection point 304 and the end selection point 305 shown in FIG. 3B are adjusted to those shown in FIG. 5B; and when the semantic granularity is a paragraph, the start selection point 304 and the end selection point 305 shown in FIG. 3B are adjusted to those shown in FIG. 5C.

In step 206, a dragging operation corresponding to the start selection point or the end selection point is received.

In step 207, when the dragging operation is to drag forward the start selection point, the first display position of the start selection point is moved forward by a number of text blocks to obtain a second display position.

For example, dragging forward may be at least one of dragging leftward horizontally and dragging upward vertically.

In some embodiments, as soon as the start selection point is dragged to a position before the first character of the text for selection, the moving forward is stopped.

In step 208, when the dragging operation is to drag backward the start selection point, the first display position of the start selection point is moved backward by a number of text blocks to obtain the second display position.

For example, dragging backward may be at least one of dragging rightward horizontally and dragging downward vertically.

In some embodiments, when the start selection point is dragged backward to a position after the end selection point, the start selection point turns into the end selection point, and the end selection point turns into the start selection point.

In step 209, when the dragging operation is to drag forward the end selection point, the first display position of the end selection point is moved forward by a number of text blocks to obtain the second display position.

In some embodiments, when the end selection point is dragged forward to a position before the start selection point, the end selection point turns into the start selection point, and the start selection point turns into the end selection point.

In step 210, when the dragging operation is to drag backward the end selection point, the first display position of the end selection point is moved backward by a number of text blocks to obtain the second display position.

In some embodiments, as soon as the end selection point is dragged backward to a position after the last character of the text for selection, the backward move is stopped.

In some embodiments, for any step of steps 207-210, when a dragging operation corresponding to the start selection point or the end selection point is received, the corresponding first display position moves forward or backward by a predetermined number of text blocks. The predetermined number may be pre-set by the system of the terminal or defined by a user.

It is to be noted that steps 207-210 may be parallel steps. When a dragging operation corresponding to the start selection point or the end selection point is received, one of steps 207-210 may be performed.

Figure 6:
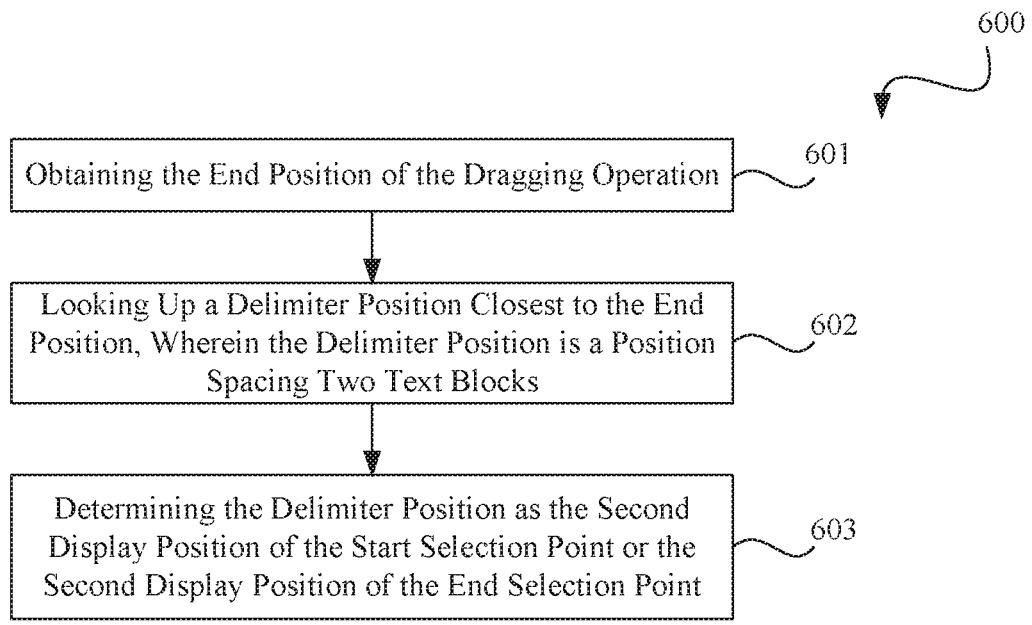
FIG. 6 is a flowchart of a method for text selection according to another exemplary embodiment.

In some embodiments, each step of steps 207-210 may be implemented as steps shown in FIG. 6. FIG. 6 is a flowchart of a method 600 for text selection that may include the following steps.

In step 601, an ending position of the dragging operation is obtained.

In step 602, a delimiter position nearest to the ending position is searched for. The delimiter position is a position between two text blocks.

In some embodiments, when the ending position is of the same distance from the left delimiter position and the right delimiter position, the ending position is randomly located at either of the left delimiter position or the right delimiter position.

In step 603, the delimiter position is determined as the second display position of the start selection point or the second display position of the end selection point.

It is to be noted that a dragging operation may be continuously performed on the start selection point or the end selection point (i.e., the above step 206 may be performed repeatedly), after the second display position of the start selection point or the second display position of the end selection point is determined.

For example, for the text for selection shown in FIG. 3A, when the semantic granularity is a word, a result of partitioning the text 302 into text blocks and adjusting the first display position of the start selection point and the first display position of the end selection point is shown in FIG. 5A. A text block "," is incorporated into content of the target text, after a backward dragging is performed on the end selection point; another text block "Sun Jian" is further incorporated into the content of the target text, after another backward dragging is performed on the end selection point; and so on.

As discussed above, in related prior art, selection for target text based only on an operation of user is not accurate enough, since the operation of user is imprecise. The methods for text selection provided by the present disclosure solves such problem by, for example, determining, in text for selection, a first display position of a start selection point and a first display position of an end selection point, partitioning the text for selection into a plurality of text blocks based on semantic meaning; receiving a dragging operation corresponding to the start selection point or the end selection point; and changing, according to the dragging operation, the first display position of the start selection point or the first display position of the end selection point to a second display position in unit of a text block. The methods change the selected target text in unit of a text block partitioned based on the semantic meaning such that content of the selected target text conforms better to the semantic meaning and is more accurate.

Figure 7:
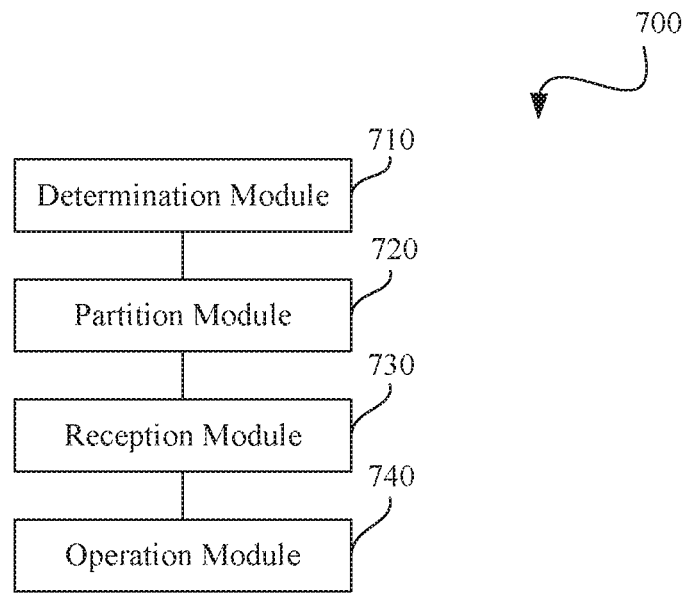
FIG. 7 is a block diagram of an apparatus for text selection according to an exemplary embodiment.

FIG. 7 is a block diagram of an apparatus 700 for text selection according to an exemplary embodiment. The apparatus 700 may include following modules.

A determination module 710 is configured to determine, in text for selection, a first display position of a start selection point and a first display position of an end selection point. Text between the start selection point and the end selection point is target text including at least one character.

A partition module 720 is configured to partition the text for selection into a plurality of text blocks based on semantic meaning.

A reception module 730 is configured to receive a dragging operation corresponding to the start selection point or the end selection point.

An operation module 740 is configured to change, according to the dragging operation, the first display position of the start selection point or the first display position of the end selection point to a second display position in unit of a text block.

As discussed above, in related prior art, selection for target text based only on an operation of user is not accurate enough, since the operation of user is imprecise. The apparatus 700 for text selection provided by the present disclosure solves such problem by, for example, determining, in text for selection, a first display position of a start selection point and a first display position of an end selection point, partitioning the text for selection into a plurality of text blocks based on semantic meaning; receiving a dragging operation corresponding to the start selection point or the end selection point; and changing, according to the dragging operation, the first display position of the start selection point or the first display position of the end selection point to a second display position in unit of a text block and the apparatus 700 changes the selected target text in unit of a text block partitioned based on the semantic meaning such that content of the selected target text conforms better to the semantic meaning and is more accurate.

Figure 8:
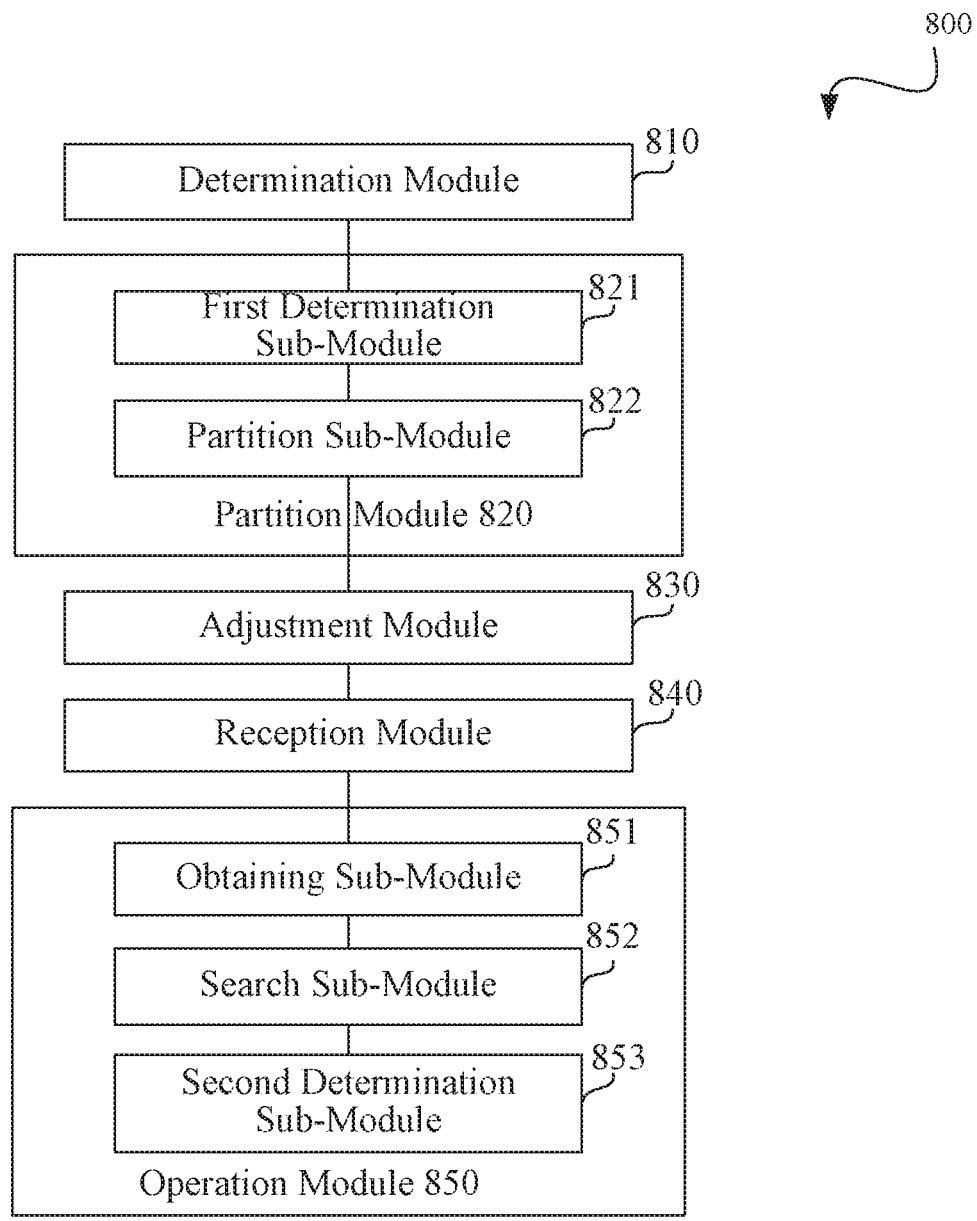
FIG. 8 is a block diagram of an apparatus for text selection according to another exemplary embodiment.

FIG. 8 is a block diagram of an apparatus 800 for text selection according to another exemplary embodiment. The apparatus 800 may include following modules.

A determination module 810 is configured to determine, in text for selection, a first display position of a start selection point and a first display position of an end selection point. Text between the start selection point and the end selection point is target text including at least one character.

A partition module 820 is configured to partition the text for selection into a plurality of text blocks based on semantic meaning.

The partition module 820 may include a first determination sub-module 821 and a partition sub-module 822.

The first determination sub-module 821 is configured to determine semantic granularity, which is one of a word, a sentence and a paragraph.

The partition sub-module 822 is configured to partition the text for selection into a number of text blocks conforming to the determined semantic granularity based on the semantic meaning.

An adjustment module 830 is configured to adjust, when at least one of the first display position of the start selection point and the first display position of the end selection point is located within a text block, the first display position of the start selection point and the first display position of the end selection point according to the text block, such that the first display position of the start selection point and the first display position of the end selection point is respectively located at a nearest delimiter position. The delimiter position is a position between two text blocks.

A reception module 840 is configured to receive a dragging operation corresponding to the start selection point or the end selection point.

An operation module 850 is configured to change, according to the dragging operation, the first display position of the start selection point or the first display position of the end selection point to a second display position in unit of a text block.

The operation module 850 is configured to: move forward the first display position of the start selection point by a number of text blocks to obtain the second display position of the start selection point, when the dragging operation is to drag forward the start selection point; move backward the first display position of the start selection point by a number of text blocks to obtain the second display position of the start selection point, when the dragging operation is to drag backward the start selection point backward; move forward the first display position of the end selection point by a number of text blocks to obtain the second display position of the end selection point, when the dragging operation is to drag forward the end selection point; or move backward the first display position of the end selection point by a number of text blocks to obtain the second display position of the end selection point, when the dragging operation is to drag backward the end selection point. Dragging forward may be at least one of dragging leftward horizontally and dragging upward vertically, and dragging backward may be at least one of dragging rightward horizontally and dragging downward vertically.

In some embodiments, the operation module 850 may include an obtaining sub-module 851, a search sub-module 852 and a second determination sub-module 853.

The obtaining sub-module 851 is configured to obtain an ending position of the dragging operation.

The search sub-module 852 is configured to search for a delimiter position nearest to the ending position. The delimiter position is a position between two text blocks.

The second determination sub-module 853 is configured to determine the delimiter position as the second display position of the start selection point or the second display position of the end selection point.

As discussed above, in related prior art, selection for target text based only on an operation of user is not accurate enough, since the operation of user is imprecise. The apparatus 800 for text selection provided by the present disclosure solves such problem in related art by, for example, determining, in text for selection, a first display position of a start selection point and a first display position of an end selection point, partitioning the text for selection into a plurality of text blocks based on semantic meaning; receiving a dragging operation corresponding to the start selection point or the end selection point; and changing, according to the dragging operation, the first display position of the start selection point or the first display position of the end selection point to a second display position in unit of a text block. The apparatus 800 changes the selected target text in unit of a text block partitioned based on the semantic meaning, such that content of the selected target text conforms better to the semantic meaning and is more accurate An apparatus for text selection is provided by an exemplary embodiment of the disclosure, which can implement the methods for text selection provided in the disclosure. The apparatus may include a processor and a memory for storing instructions executable by the processor. The processor is configured to determine, in text for selection, a first display position of a start selection point and a first display position of an end selection point, wherein text between the start selection point and the end selection point is target text including at least one character; partition the text for selection into a plurality of text blocks based on semantic meaning; receive a dragging operation corresponding to the start selection point or the end selection point; and change, according to the dragging operation, the first display position of the start selection point or the first display position of the end selection point to a second display position in unit of a text block.

Figure 9:
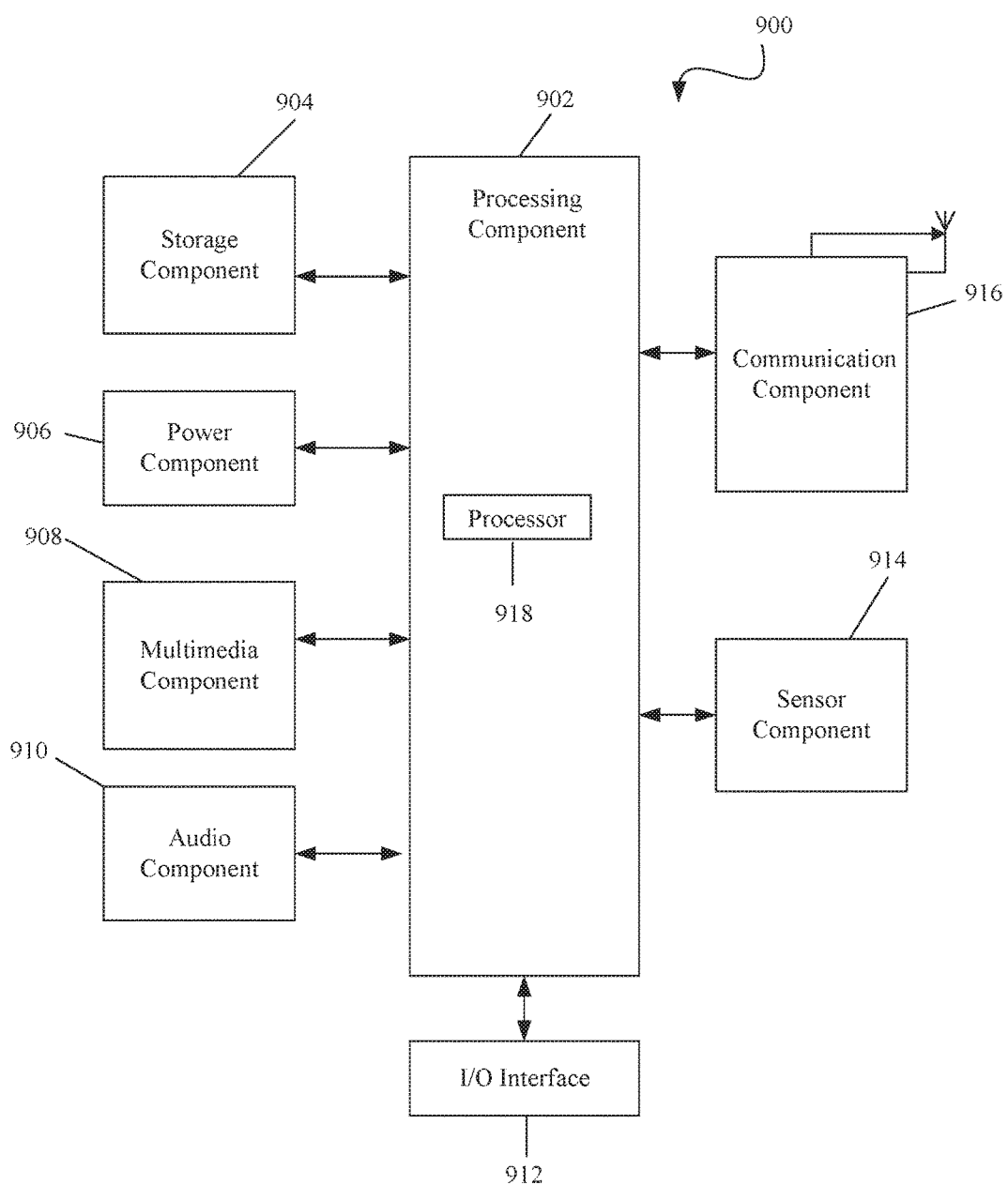
FIG. 9 is a block diagram of an apparatus for text selection according to yet another exemplary embodiment.

FIG. 9 is a block diagram illustrating an apparatus 900 for text selection according to an exemplary embodiment. For example, the apparatus 900 may be a mobile phone, a computer, a digital broadcast terminal, a messaging device, a gaming console, a tablet, a medical device, an exercise equipment, a personal digital assistant, and the like.

Referring to FIG. 9, the apparatus 900 may include one or more of the following components: a processing component 902, a storage component 904, a power component 906, a multimedia component 908, an audio component 910, an input/output (I/O) interface 912, a sensor component 914, and a communication component 916.

The processing component 902 typically controls overall operations of the apparatus 900, such as the operations associated with display, telephone calls, data communications, camera operations, and recording operations. The processing component 902 may include one or more processors 918 to execute instructions to perform all or part of the steps in the above described methods. Moreover, the processing component 902 may include one or more modules which facilitate the interaction between the processing component 902 and other components. For instance, the processing component 902 may include a multimedia module to facilitate the interaction between the multimedia component 908 and the processing component 902.

The storage component 904 is configured to store various types of data to support the operation of the apparatus 900. Examples of such data include instructions for any applications or methods operated on the apparatus 900, contact data, phonebook data, messages, pictures, video, etc. The storage component 904 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 906 provides power to various components of the apparatus 900. The power component 906 may include a power management system, one or more power sources, and any other components associated with the generation, management, and distribution of power for the apparatus 900.

The multimedia component 908 includes a screen providing an output interface between the apparatus 900 and a user. In some embodiments, the screen may include a liquid crystal display (LCD) and a touch panel. If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 908 includes a front camera and/or a rear camera. The front camera and the rear camera may receive an external multimedia datum while the apparatus 900 is in an operation mode, such as a photographing mode or a video mode. Each of the front camera and the rear camera may be a fixed optical lens system or have optical focusing and zooming capability.

The audio component 910 is configured to output and/or input audio signals. For example, the audio component 910 includes a microphone (MIC) configured to receive an external audio signal when the apparatus 900 is in an operation mode, such as a call mode, a recording mode, and a voice recognition mode. The received audio signal may be further stored in the storage component 904 or transmitted via the communication component 916. In some embodiments, the audio component 910 further includes a speaker to output audio signals.

The I/O interface 912 provides an interface between the processing component 902 and peripheral interface modules, the peripheral interface modules being, for example, a keyboard, a click wheel, buttons, and the like. The buttons may include, but are not limited to, a home button, a volume button, a starting button, and a locking button.

The sensor component 914 includes one or more sensors to provide status assessments of various aspects of the apparatus 900. For instance, the sensor component 914 may detect an open/closed status of the apparatus 900, relative positioning of components (e.g., the display and the keypad of the apparatus 900), a change in position of the apparatus 900 or a component of the apparatus 900, a presence or absence of user contact with the apparatus 900, an orientation or an acceleration/deceleration of the apparatus 900, and a change in temperature of the apparatus 900. The sensor component 914 may include a proximity sensor configured to detect the presence of a nearby object without any physical contact. The sensor component 914 may also include a light sensor, such as a CMOS or CCD image sensor, for use in imaging applications. In some embodiments, the sensor component 914 may also include an accelerometer sensor, a gyroscope sensor, a magnetic sensor, a pressure sensor, or a temperature sensor.

The communication component 916 is configured to facilitate communication, wired or wirelessly, between the apparatus 900 and other devices. The apparatus 900 can access a wireless network based on a communication standard, such as WiFi, 2G, 3G, or 4G or a combination thereof. In an exemplary embodiment, the communication component 916 receives a broadcast signal or broadcast associated information from an external broadcast management system via a broadcast channel. In an exemplary embodiment, the communication component 916 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, the apparatus 900 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In exemplary embodiments, there is also provided a non-transitory computer-readable storage medium including instructions, such as included in the storage component 904, executable by the processor 918 in the apparatus 900, for performing the above-described methods. For example, the non-transitory computer-readable storage medium may be a ROM, a random access memory (RAM), a CD-ROM, a magnetic tape, a floppy disc, an optical data storage device, and the like.

One of ordinary skill in the art will understand that the above described modules can each be implemented by hardware, or software, or a combination of hardware and software. One of ordinary skill in the art will also understand that multiple ones of the above described modules may be combined as one module, and each of the above described modules may be further divided into a plurality of sub-modules.

Other embodiments of the invention will be apparent to those skilled in the art from consideration of the specification and practice of the disclosures herein. This application is intended to cover any variations, uses, or adaptations of the disclosure following the general principles thereof and including such departures from the present disclosure as come within known or customary practice in the art. It is intended that the specification and examples be considered as exemplary only, with a true scope and spirit of the invention being indicated by the following claims.

It will be appreciated that the disclosure is not limited to the exact construction that has been described above and illustrated in the accompanying drawings, and that various modifications and changes can be made without departing from the scope thereof. It is intended that the scope of the invention only be limited by the appended claims.

What is claimed is:

1. A method for text selection for use in a terminal having a touch screen, comprising:
    determining, in text for selection, a first display position of a start selection point and a first display position of an end selection point, wherein text between the start selection point and the end selection point is target text including at least one character;
    partitioning the text for selection into a plurality of text blocks based on semantic meaning;
    receiving a dragging operation on the touch screen corresponding to the start selection point or the end selection point;
    changing, according to the dragging operation, the first display position of the start selection point or the first display position of the end selection point to a corresponding second display position in unit of a text block; and
    adjusting, when at least one of the first display position of the start selection point and the first display position of the end selection point is located within a text block, the first display position of the start selection point and the first display position of the end selection point according to the text block, such that each of the first display position of the start selection point and the first display position of the end selection point is located at a nearest delimiter position, wherein the delimiter position is a position between two text blocks.

2. The method of claim 1, wherein partitioning the text for selection into a plurality of text blocks based on the semantic meaning comprises:
    determining a semantic granularity to be one of a word, a sentence, or a paragraph; and
    partitioning the text for selection into the plurality of text blocks conforming to the semantic granularity based on the semantic meaning.

3. The method of claim 2, wherein changing, according to the dragging operation, the first display position of the start selection point or the first display position of the end selection point to the corresponding second display position comprises one or more of the following:
    moving forward the first display position of the start selection point by a first number of text blocks to obtain the corresponding second display position, when the dragging operation is to drag forward the start selection point;
    moving backward the first display position of the start selection point by a second number of text blocks to obtain the corresponding second display position, when the dragging operation is to drag backward the start selection point;
    moving forward the first display position of the end selection point by a third number of text blocks to obtain the corresponding second display position, when the dragging operation is to drag forward the end selection point; and
    moving backward the first display position of the end selection point by a fourth number of text blocks to obtain the corresponding second display position, when the dragging operation is to drag backward the end selection point;
    wherein the dragging forward is at least one of dragging leftward horizontally and dragging upward vertically, and the dragging backward is at least one of dragging rightward horizontally and dragging downward vertically.

4. The method of claim 2, wherein changing, according to the dragging operation, the first display position of the start selection point or the first display position of the end selection point into the corresponding second display position comprises:

obtaining an ending position of the dragging operation;
search for a delimiter position nearest to the ending position, wherein the delimiter position is a position between two text blocks; and
determining the delimiter position as the corresponding second display position of the start selection point or the second display position of the end selection point.

5. The method of claim 1, wherein changing, according to the dragging operation, the first display position of the start selection point or the first display position of the end selection point to the corresponding second display position comprises performing at least one of:

moving forward the first display position of the start selection point by a first number of text blocks to obtain the corresponding second display position, when the dragging operation is dragging forward the start selection point;
moving backward the first display position of the start selection point by a second number of text blocks to obtain the corresponding second display position, when the dragging operation is dragging backward the start selection point;
moving forward the first display position of the end selection point by a third number of text blocks to obtain the corresponding second display position, when the dragging operation is dragging forward the end selection point; and
moving backward the first display position of the end selection point by a fourth number of text blocks to obtain the corresponding second display position, when the dragging operation is dragging backward the end selection point;
wherein the dragging forward is at least one of dragging leftward horizontally and dragging upward vertically, and the dragging backward is at least one of dragging rightward horizontally and dragging downward vertically.

6. The method of claim 1, wherein changing, according to the dragging operation, the first display position of the start selection point or the first display position of the end selection point into the corresponding second display position comprises:

obtaining an ending position of the dragging operation;
searching for a delimiter position nearest to the ending position, wherein the delimiter position is a position between two text blocks; and
determining the delimiter position as the corresponding second display position of the start selection point or the second display position of the end selection point.

7. An apparatus for text selection, comprising:
a touch screen;
a processor; and
a memory for storing instructions executable by the processor;
wherein the processor is configured to:
determine, in text for selection, a first display position of a start selection point and a first display position of an end selection point, wherein text between the start selection point and the end selection point is target text including at least one character;
partition the text for selection into a plurality of text blocks based on semantic meaning;
receive a dragging operation on the touch screen corresponding to the start selection point or the end selection point;
change, according to the dragging operation, the first display position of the start selection point or the first display position of the end selection point to a corresponding second display position in unit of a text block; and
adjust, when at least one of the first display position of the start selection point and the first display position of the end selection point is located within a text block, the first display position of the start selection point and the first display position of the end selection point according to the text block, such that each of the first display position of the start selection point and the first display position of the end selection point is located at a nearest delimiter position, wherein the nearest delimiter position is a position between two text blocks.

8. The apparatus of claim 7, wherein the processor is further configured to:
determine a semantic granularity to be one of a word, a sentence, or a paragraph; and
partition the text for selection into the plurality of text blocks conforming to the semantic granularity based on the semantic meaning.

9. The apparatus of claim 8, wherein the processor is further configured to perform at least one of:
moving forward the first display position of the start selection point by a first number of text blocks to obtain the corresponding second display position, when the dragging operation is dragging forward the start selection point;
moving backward the first display position of the start selection point by a second number of text blocks to obtain the corresponding second display position, when the dragging operation is dragging backward the start selection point backward;
moving forward the first display position of the end selection point by a third number of text blocks to obtain the corresponding second display position, when the dragging operation is dragging forward the end selection point;
moving backward the first display position of the end selection point by a fourth number of text blocks to obtain the corresponding second display position, when the dragging operation is dragging backward the end selection point backward;
wherein the dragging forward is at least one of dragging leftward horizontally and dragging upward vertically, and the dragging backward is at least one of dragging rightward horizontally and dragging downward vertically.

10. The apparatus of claim 8, wherein the processor is further configured to:
obtain an ending position of the dragging operation;
search for a delimiter position nearest to the ending position, wherein the delimiter position is a position between two text blocks; and
determine the delimiter position as the corresponding second display position of the start selection point or the second display position of the end selection point.

11. The apparatus of claim 7, wherein the processor is further configured to perform at least one of:

moving forward the first display position of the start selection point by a first number of text blocks to obtain the corresponding second display position, when the dragging operation is dragging forward the start selection point;

moving backward the first display position of the start selection point by a second number of text blocks to obtain the corresponding second display position, when the dragging operation is dragging backward the start selection point backward;

moving forward the first display position of the end selection point by a third number of text blocks to obtain the corresponding second display position, when the dragging operation is dragging forward the end selection point; and moving backward the first display position of the end selection point by a fourth number of text blocks to obtain the corresponding second display position, when the dragging operation is dragging backward the end selection point backward;

wherein the dragging forward is at least one of dragging leftward horizontally and dragging upward vertically, and the dragging backward is at least one of dragging rightward horizontally and dragging downward vertically.

12. The apparatus of claim 7, wherein the processor is further configured to:

obtain an ending position of the dragging operation;

search for a delimiter position nearest to the ending position, wherein the delimiter position is a position between two text blocks; and determine the delimiter position as the corresponding second display position of the start selection point or the second display position of the end selection point.

13. A non-transitory computer-readable storage medium having stored thereon, instructions that, when executed by a processor of a terminal having a touch screen, cause the terminal to perform a method for text selection comprising:

determining, in text for selection, a first display position of a start selection point and a first display position of an end selection point, wherein text between the start selection point and the end selection point is target text including at least one character;

partitioning the text for selection into a plurality of text blocks based on semantic meaning;

receiving a dragging operation on the touch screen corresponding to the start selection point or the end selection point;

changing, according to the dragging operation, the first display position of the start selection point or the first display position of the end selection point to a corresponding second display position in unit of a text block; and adjusting, when at least one of the first display position of the start selection point and the first display position of the end selection point is located within a text block, the first display position of the start selection point and the first display position of the end selection point according to the text block, such that each of the first display position of the start selection point and the first display position of the end selection point is located at a nearest delimiter position, wherein the delimiter position is a position between two text blocks.

* * * * *